(12) United States Patent
Assante et al.

(10) Patent No.: US 11,483,331 B2
(45) Date of Patent: Oct. 25, 2022

(54) CONSEQUENCE-DRIVEN CYBER-INFORMED ENGINEERING AND RELATED SYSTEMS AND METHODS

(71) Applicant: Battelle Energy Alliance, LLC, Idaho Falls, ID (US)

(72) Inventors: Michael Assante, Alta, WY (US); Curtis St. Michel, Idaho Falls, ID (US); Sarah G. Freeman, Blackfoot, ID (US); Robert T. Smith, Idaho Falls, ID (US); Andrew A. Bochman, Milwaukee, WI (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 558 days.

(21) Appl. No.: 16/290,511

(22) Filed: Mar. 1, 2019

(65) Prior Publication Data

US 2019/0273756 A1    Sep. 5, 2019

Related U.S. Application Data

(60) Provisional application No. 62/637,826, filed on Mar. 2, 2018.

(51) Int. Cl.
*H04L 9/40* (2022.01)
*G05B 19/418* (2006.01)

(52) U.S. Cl.
CPC ...... *H04L 63/1433* (2013.01); *G05B 19/4185* (2013.01); *G05B 19/4188* (2013.01); *H04L 63/1441* (2013.01)

(58) Field of Classification Search
CPC ............ H04L 63/1433; H04L 63/1441; G05B 19/4185; G05B 19/4188
See application file for complete search history.

(56) References Cited

U.S. PATENT DOCUMENTS 10,250,619 B1 *  4/2019  Park ................. H04L 63/18
2012/0180133 A1 *  7/2012  Al-Harbi ........... H04L 63/1433
                                                 726/25

(Continued)

FOREIGN PATENT DOCUMENTS

AU        2014100907 A4 *   9/2014

OTHER PUBLICATIONS

Pilot Project Training, "Consequence-driven Cyber-informed Engineering (CCE)," INL Idaho National Laboratory, Dec. 4, 2017, 113 page.

(Continued)

*Primary Examiner* — Matthew Smithers
*Assistant Examiner* — Shu Chun Gao
(74) *Attorney, Agent, or Firm* — TraskBritt

(57) ABSTRACT

Embodiments of the disclosure relate to a computer-implemented consequence-driven cyber-informed engineering tool for performing and reporting consequence-based prioritization, system-of-systems breakdown, consequence-based targeting, and mitigations and protections. Embodiments of a CCE tool may perform one or more steps of defining a target industrial control system (ICS), wherein the target ICS includes operational goals, critical functions, and critical services; determining one or more scored high consequence events (HCE) associated with the defined target ICS; prioritizing the scored HCEs according to an HCE severity index; and updating a dashboard with one or more representations of the prioritized HCEs, wherein the updated dashboard is associated with the CCE tool and presented at a display.

9 Claims, 7 Drawing Sheets
(6 of 7 Drawing Sheet(s) Filed in Color)

(56) References Cited

U.S. PATENT DOCUMENTS

2014/0137257 A1* 5/2014 Martinez ............. H04L 63/1433
726/25
2016/0274552 A1* 9/2016 Strohmenger ......... G06Q 10/06

OTHER PUBLICATIONS

Consequence-driven Cyber-informed Engineering (CCE), Mission Support Center National & Homeland Security Directorate Idaho National Laboratory, Jul. 14, 2016, 5 pages.
Consequence-driven Cyber-informed Engineering (CCE), Mission Support Center National & Homeland Security Directorate Idaho National Laboratory, INL/EXT-16-39212, Oct. 18, 2016, 5 pages.
Anderson et al., "The Need for Cyber-Informed Engineering Expertise for Nuclear Research Reactors," Idaho National Laboratory (INL), Idaho Falls, Idaho, United States, Dec. 2015, 10 pages.
Anderson et al., "Cyber-Informed Engineering: The Need for a New Risk Informed and Design Methodology," Idaho National Laboratory (INL), Idaho Falls, Idaho, United States, Jun. 2015, 11 pages.
Anderson et al., "Cyber-Informed Engineering," Idaho National LaboratoryIdaho Falls, Idaho 83415, INL/EXT-16-40099, Revision 0, Mar. 2017, 45 pages.

* cited by examiner

| Criteria | Low | Medium | High |
|---|---|---|---|
| Area Impacted | Loss of load in MW (or) number of customers impacted (i.e. up to 500 MW, 1 million customers) | Loss of load in MW (or) number of customers impacted (i.e. 1,000 MW to 9,999 MW, 1 million customers) | Loss of load 1,500 MW or more (or) over 10 million customers impacted |
| Duration | Return of all service measured in hours | Inability to serve 1,000 MW 3-4 days after the initial loss (or) inability to provide steady service to up to 2 million residential customers after five days | Inability to serve 10,000 MW 5 days after the initial loss (or) inability to provide steady service to over 2 million residential customers after 14 days |

*FIGURE 3A*

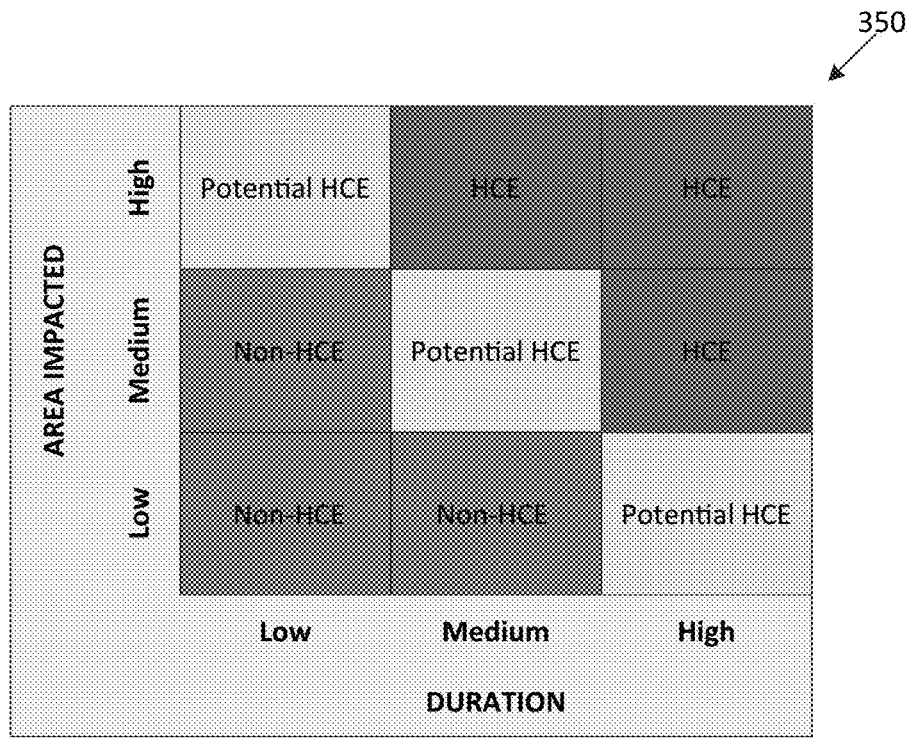

*FIGURE 3B*

| Criteria | | Weighting Factor | Scoring Parameters | | | |
|---|---|---|---|---|---|---|
| | | | 0 | 1 | 5 | 10 |
| 3 | Public Safety | | None | 10-20 Injuries | 100 Injured | One Death possible |
| 4 | Workforce Safety | | - | None | Any injury | Any death |
| 5 | Skills Required | | Deep domain/insider knowledge, custom attack tools | Domain knowledge and cyber-attack techniques | Special insider knowledge needed | Basic domain understanding and computer skills |
| 6 | Run Time to Execute Attack | | | | | |
| 7 | Damage Radius - Within Utility | | None | Disruption only no damage to ICS or physical system | Disruption plus damage to the ICS (or) a small number of physical elements contained to a specific type of equipment damaged | Damage to physical equipment in scale or by diversity causing specific circuits or generation units to be offline for extended (greater than 1 month) |
| 8 | Damage to Confidence in Utility (public opinion) | | None | negative publicity, no financial loss | negative publicity, up to 20% less interest in advanced programs | negative publicity, more than 20% less interest in advanced programs |
| 9 | Cost of Event - including recovery time | | Petty cash or less _432_ | < 1% of utility O&M budget _432_ | <= 10% of utility O&M budget _432_ | > 10% of utility O&M budget _432_ |
| 10 | Cost Due to Impact in Capital/Billing | | None | Isolated, recoverable errors in customer bills | Widespread, but correctable errors in bills | Widespread loss of accurate power usage, unrecoverable |

*FIGURE 4*

| Criteria | Weighting Factor | HIGH CONSEQUENCE EVENTS ||||| 
| | | HCE 1 | HCE 2 | HCE 3 | HCE 4 | HCE 5 |
| --- | --- | --- | --- | --- | --- | --- |
| 3 | Public Safety | | | | | |
| 4 | Workforce Safety | | | | | |
| 5 | Skills Required | | | | | |
| 6 | Run Time to Execute Attack | | | | | |
| 7 | Damage Radius - Within Utility | | | | | |
| 8 | Damage to Confidence in Utility (public opinion) | | | | | |
| 9 | Cost of Event - including recovery time | | | | | |
| 10 | Cost Due to Loss of Customers | | | | | |
| 11 | Cost Due to Impact in Capital/Billing | | | | | |
| | TOTAL SCORE | | | | | |

*FIGURE 5*

CONSEQUENCE-DRIVEN CYBER-INFORMED ENGINEERING AND RELATED SYSTEMS AND METHODS

CROSS-REFERENCE TO RELATED APPLICATION

This application claims the benefit under 35 U.S.C. § 119(e) of U.S. Provisional Patent Application Ser. No. 62/637,826, filed Mar. 2, 2018, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The embodiments of the present disclosure generally relate to cyber security and vulnerability assessment of industrial control systems.

BACKGROUND

Organizations of all types and sizes attempt to limit their exposure to, and damage from, cybersecurity adversaries (human and automated) by purchasing protective services and tools, and attempting to adhere to generally accepted cybersecurity best practices. These activities, often referred to as "cyber hygiene," are generally considered effective against non-targeted attacks, but they have little-to-no efficacy against targeted attacks by well-resourced cyber adversaries.

Asset-intensive industrial infrastructure like energy, chemical and transportation companies, water utilities, and defense, rely on various types of mechanical equipment and systems to support their most important processes and fulfill their respective missions. Before the modern computer era, this equipment was typically powered by liquid or solid fuels and/or electricity and controlled locally by human operators. With the advent of increasingly powerful and ubiquitous, automated computer, networking, and communications technologies (referred to herein as "operational technology" or "OT"), these systems have been "modernized" to achieve greater reliability, efficiency and cost savings. Industrial infrastructure is now so dependent on automated, computer-based, support systems that many processes cannot function without them.

Conventional OT may be breached and manipulated by skilled cyber adversaries; and cyber hygiene, even if performed thoroughly, consistently and comprehensively, is necessary but far from sufficient. Especially as the processes these systems support are often of critical importance to their organizations and customers, not to mention sometimes highly dangerous.

Conventional solutions to OT security risk include defensive cybersecurity tools in categories including: Security Incident and Event Management Systems (STEMS), Intrusion Detection Systems (IDSs), Intrusion Prevention Systems (IPSs), firewalls, unidirectional gateways, and Virtual Private Networks (VPNs), many of which were designed to function in information technology (IT) environments and have been only partially adapted to the constraints of the OT world. Conventional solutions also may conform to best practices including network segmentation, identity and access management, strong and regularly changed passwords, awareness training, and more.

BRIEF DESCRIPTION OF THE DRAWINGS

Purposes and advantages of disclosed embodiments will be apparent to one of ordinary skill in the art from the summary in conjunction with the detailed description and appended drawings that follow. The patent or application file contains at least one drawing executed in color. Copies of this patent or patent application publication with color drawing(s) will be provided by the Office upon request and payment of the necessary fee.

FIG. 3A shows a functional representation of a filter that may be applied by a CCE tool to screen adverse events through a first order effect of an evaluation methodology to begin to address the most impactful events, in accordance with embodiments of the disclosure.

FIG. 3B shows a functional representation of a filter that may be applied to a CCE tool to identify those events that are considered HCE per the filter shown in FIG. 3A, in accordance with embodiments of the disclosure.

FIG. 4 shows a functional representation of a scoring model that may be applied by a CCE tool, in accordance with embodiments of the disclosure.

FIG. 5 shows a functional representation of a prioritization model that may be applied by a CCE tool, in accordance with embodiments of the disclosure.

DETAILED DESCRIPTION

Instead of layering on ever more complex and software-intensive digital technologies, after identifying the absolute most critical processes, embodiments of the present disclosure relate to analysis and determination to reduce the exposure of essential processes of critical infrastructure via operational technology (OT) systems that support them.

Consequence-driven cyber-informed engineering (CCE) is a methodology for removing most if not all of the "cyber risk" from OT processes, by engineering or re-engineering different approaches for performing processes that involve greatly reduced reliance on automation technologies.

The Idaho National Lab (INL) is leading a high-impact, national security-level initiative to re-prioritize the way the nation looks at high-consequence risk within the industrial control systems (ICS) environment of the country's most critical infrastructure and other national assets. The CCE methodology effort provides both private and public organizations with the steps required to examine their own environments for high-impact events/risks; identify implementation of key devices and components that facilitate that risk; illuminate specific, plausible cyber-attack pathways to manipulate these devices; and develop concrete mitigations, protections, and tripwires to address the high-consequence risk. CCE efforts may help organizations take steps to thwart cyber-attacks from even top-tier, highly resourced adversaries that would result in catastrophic physical effects.

Unfortunately, process control engineers have little-to-no training in, or understanding of, cyber risks to their systems. They highly value reliable performance and safety. Further, cybersecurity practitioners are charged with ensuring the cyber hygiene of their organizations and not to fully eliminate cyber risk. Finally, line of business and corporate executives often have the misconception that cyber hygiene will fully protect their organizations, including their most mission critical processes.

Various embodiments of the present disclosure relate to a computer-implemented CCE tool for performing and reporting consequence-based prioritization, system organization, consequence-based targeting, and mitigation and protection. Embodiments of CCE tools may include various functional modules, including, a work-flow engine for directing a user through collecting information and selecting various parameters, an analysis engine for performing the scoring, prioritization and other analysis described herein, and a reporting engine for reporting the output of the CCE tool. A user may interact with the various functional modules via a dashboard. In one embodiment a CCE tool may be implemented on a computer system, for example, as a computer application.

Some embodiments of CCE tools of the present disclosure include features, models, and interfaces to implement a workflow to analyze critical infrastructure, and more specifically, industrial control systems (ICS).

Figure 1:
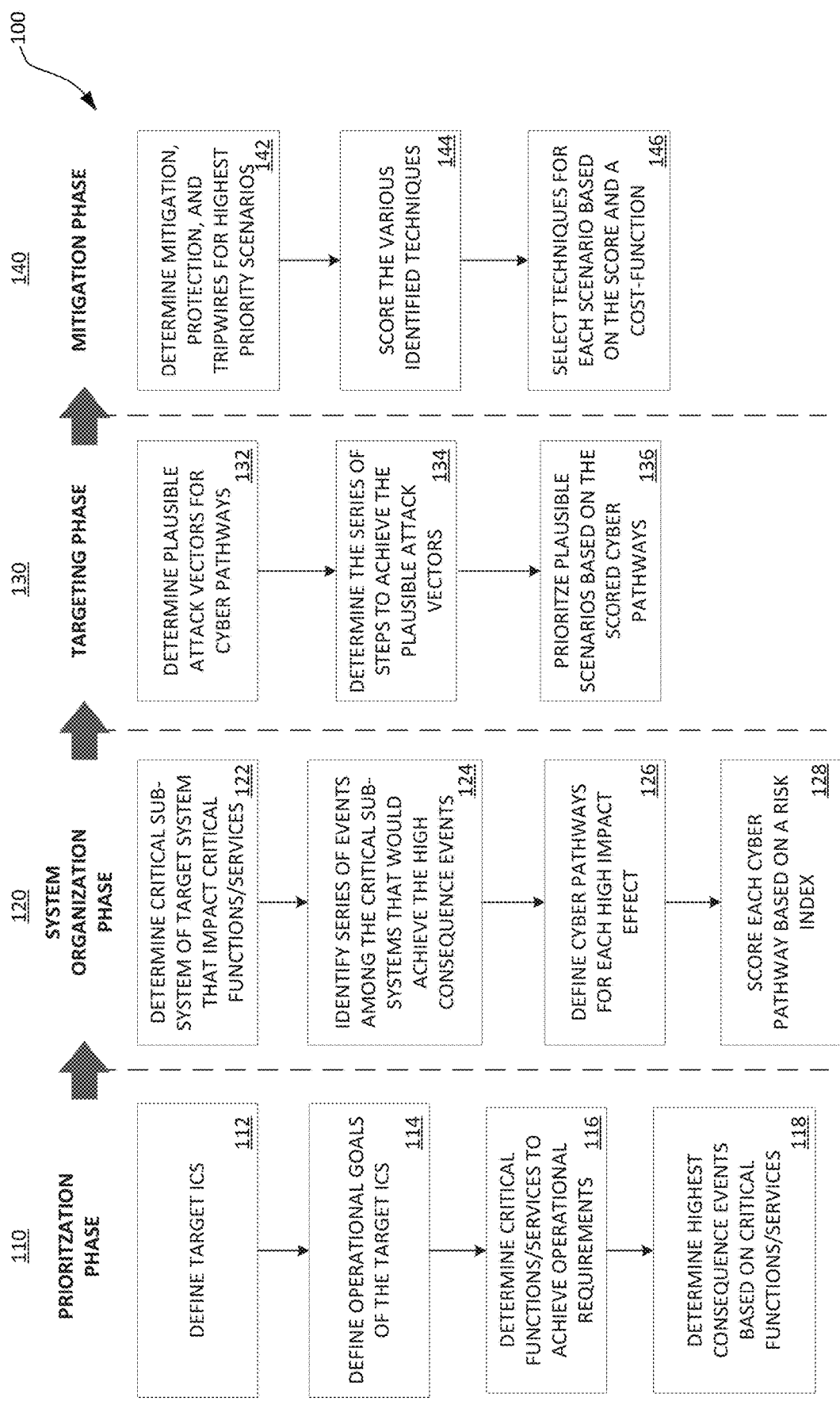
FIG. 1 shows a flow chart of a workflow, in accordance with embodiments of the disclosure.

FIG. 1 shows an ICS workflow 100 performed in conjunction with a CCE tool in accordance with embodiments of the disclosure. The ICS workflow 100 includes four phases: a Consequence Prioritization phase 110, a System-of-Systems Breakdown phase 120, a Consequence-based Targeting phase 130, and a Mitigations and Protections phase 140.

For the Consequence Prioritization phase 110, in operation 112, a target ICS is defined. In operation 114, operational goals of the target ICS are defined. In operation 116, operational requirements of the target ICS are defined and the critical functions and/or services associated with the target ICS that achieve the defined operational requirements are identified. In operation 118, the highest consequence events are determined based on the critical functions and/or services identified in operation 116.

For the System-of-Systems Breakdown phase 120, in operation 122, critical sub-system(s) of the target ICS that impact the critical functions and/or services are determined. In operation 124, one or more series of events among the critical sub-systems that would achieve high consequence events (e.g., that are adverse to the operational requirements of the ICS) are determined. In operation 126, cyber-pathways for each high impact series of events are determined and defined. In operation 128, each cyber-pathway is scored based on a risk index.

For the Consequence-based Targeting phase 130, in operation 132, plausible attack vectors for cyber pathways are determined. In operation 134, a series of steps to achieve the plausible attack vectors are determined. In operation 136, the plausible attack vectors are prioritized based on the scored cyber pathways and the steps to achieve the plausible attack vectors determined in operation 134.

For the Mitigations and Protections phase 140, in operation 142, mitigations, protections, and tripwires (referred to collectively herein as "mitigations") are determined for the highest priority plausible attack vectors. In operation 144, the various determined mitigations are scored. In operation 146, a subset of the mitigations is selected based on the scores from operation 144 and, optionally, a cost-function.

An output of phase 1, Consequence Prioritization, is the identification of the high consequence events (HCEs) that could occur. For example, HCEs may include events that stretch a target ICS beyond normal reliability from a continuity of operations (COOP) perspective. These HCEs move beyond threats that can be addressed by standard cyber-hygiene practices and focus analysis on addressing targeted attacks intending disruption, damage, or destruction of OT systems. When identifying these HCE, a CCE tool may employ both cyber security and engineering expertise, as in-depth engineering perspectives assist identify, characterize and avert HCEs. Additionally, consequence prioritization may help identify specific areas that require concerted effort in updating and maintaining basic cybersecurity hygiene practices.

Figure 2:
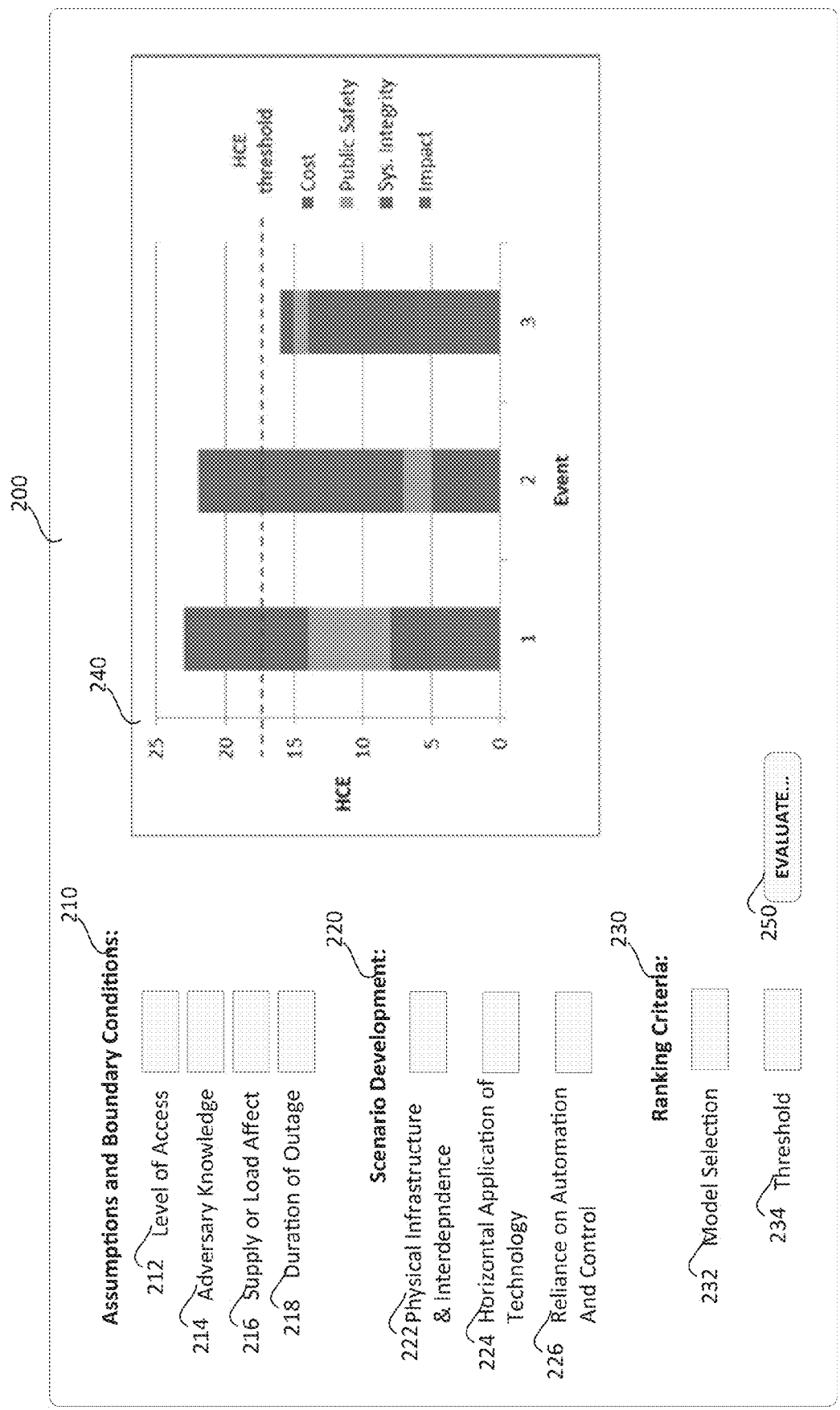
FIG. 2 shows a consequence prioritization interface, in accordance with embodiments of the disclosure.

FIG. 2 shows a consequence prioritization interface 200, in accordance with embodiments of the disclosure. The consequence prioritization interface 200 includes three sections associated with the ICS system: assumptions and boundary conditions 210, scenario development 220, and ranking criteria 230 hat include fields (or menus, toggles, radio buttons, etc.) for entering parameters. A display region 240 is configured to display results of an HCE severity analysis in accordance with embodiments of the disclosure.

The assumptions and boundary conditions 210 includes level of access 212, adversary knowledge 214, supply or load affect 216, and duration of outage 218. Level of access 212 may describe levels of access required to impact a target ICS: (i) if an adversary has logical access, including: all credentials, IP addresses, Firewall and application access, diverse control and monitoring system (DCMS); and (ii) if an adversary has access to the necessary types of engineering to programming tools. Level of adversary knowledge 214, in the OT environment required to impact a system may describe to what extent an adversary must understand critical equipment and processes. Level of supply or load from a generation capacity affected may describe an amount of generation capacity loss (or service degradation) necessary to impact customers. Level of damage may describe an amount in monetary terms of damage necessary to impact an organization. Duration of outage may describe a length of outage time necessary to impact customers and business.

Scenario development 220 includes physical infrastructure and interdependence 222, horizontal application of technology 224, and reliance on automation and control 226. Infrastructure and interdependence 222 may describe choke points an adversary would target. Horizontal application of technology 224 may describe one or more technologies widely deployed throughout a target ICS, for example, control system platforms, protective relays manufacturers, smart meter manufacturers. Reliance on automation and control 226 may describe one or more processes that have been automated that cannot be performed manually if they are taken out of service, for example, energy managements systems.

Ranking criteria 230 includes model selection 232, threshold 234 and evaluate 250.

The display region 240 may be configured to receive the results of, and display, an HCE severity calculation. In one embodiment, the HCE severity calculation may be determined using Equation 1:

HCE Severity=α(Area Impacted)+β(Duration)+γ(Attack Breadth)+δ(System Integrity)+ε(Safety)+ξ(Cost)

HCE Severity=3(1)+3(5)+3(3)+2(3)+2(1)+1(3)=38

HCE Severity=(38/70)*100=54%

α, β, γ, δ, and ε, are weighting factors that may be defined in a selected model or provided as parameters.

FIG. 3A shows a functional representation of a filter 300 that may be applied by a CCE tool to screen adverse events through a first order effect of an evaluation methodology to begin to address the most impactful events, in accordance with embodiments of the disclosure. Area impact may describe whether the impact of a failure scenario is geographically localized, or may impact an entire system. Duration may describe a length of an outage (e.g., a failure to provide critical services/functions). Other criteria may be included, for example, attack breadth, system integrity confidence, safety, and cost of event. Attack breadth may describe the extent to which a targeted technology or system is deployed resulting in adverse operational effects. The greater the span of impacted systems, the more difficult the restoration following an adverse event. System integrity confidence may describe whether or not restoration and recovery efforts can restore system integrity with confidence following an adverse event (i.e., a system not operating as expected (or intended) or malicious operation conducted by unauthorized users). One factor to consider is whether or not the initial attack propagates in multiple systems and therefore complicates restoration efforts. All of these may negatively impact an organization's confidence in their system following an adverse event. Safety may describe the potential impact on safety, including injuries requiring first aid or loss of life. For example, a power system outage resulting in health hazards or mortalities directly tied to the lack of available electric power (a critical function). Cost of event (including restoration) may describe a direct financial loss to the utility as a result of the failure scenario including restoration costs which is the cost to return the system to proper operation, not including any legal or other reparations as a result of the failure.

FIG. 3B shows a functional representation of a filter 350 that may be applied to a CCE tool to identify those events that are considered HCE per filter 300, in accordance with embodiments of the disclosure. The events determined to be HCE may be further evaluated and prioritized.

FIG. 4 shows a functional representation of a scoring model 400 that may be applied by a CCE tool, in accordance with embodiments of the disclosure. The scoring model 400 may include criteria 410, weighting factors 420, and scoring parameters 430. In one embodiment, the weighting factors 420 may be parameters provided by a user to a CCE tool. The weighting factors 420 may indicate a scored importance of the criteria to a target ICS and/or organization. The scoring parameters 430 may associate a scoring methodology (e.g., values 0 to 10) to scoring definitions 432 (for ease of illustration, only the scoring definitions in row 9 have been labeled). In one embodiment, the scoring methodology and scoring definitions 432 of the scoring parameters 430 may be parameters provided by a user.

FIG. 5 shows a functional representation of a prioritization model 500 that may be applied by a CCE tool, in accordance with embodiments of the disclosure. The prioritization model 500 may include criteria 510, weighting factors 520, and high consequence events 530. For each criterion, an associated score may be applied to each event based on the scoring parameters 430 of the scoring model 400 shown in FIG. 4. In one embodiment, the prioritization model 500 may conduct an evaluation by completing one criterion at a time, however, groups of criterion may be evaluated together. Each associated scoring parameter may be multiplied by the assigned weighting parameter and summed with the other criterion for a given HCE to arrive at a total score 530 for an HCE.

Total scores 530 may be displayed by a CCE tool, for example, in a display region 240 of an interface 200 shown in FIG. 2. Notably, the components of each total score 530 may be displayed for each HCE. By way of example, the HCE 1 shown in FIG. 2 includes cost, public safety, system integrity, and impact.

Figure 6:
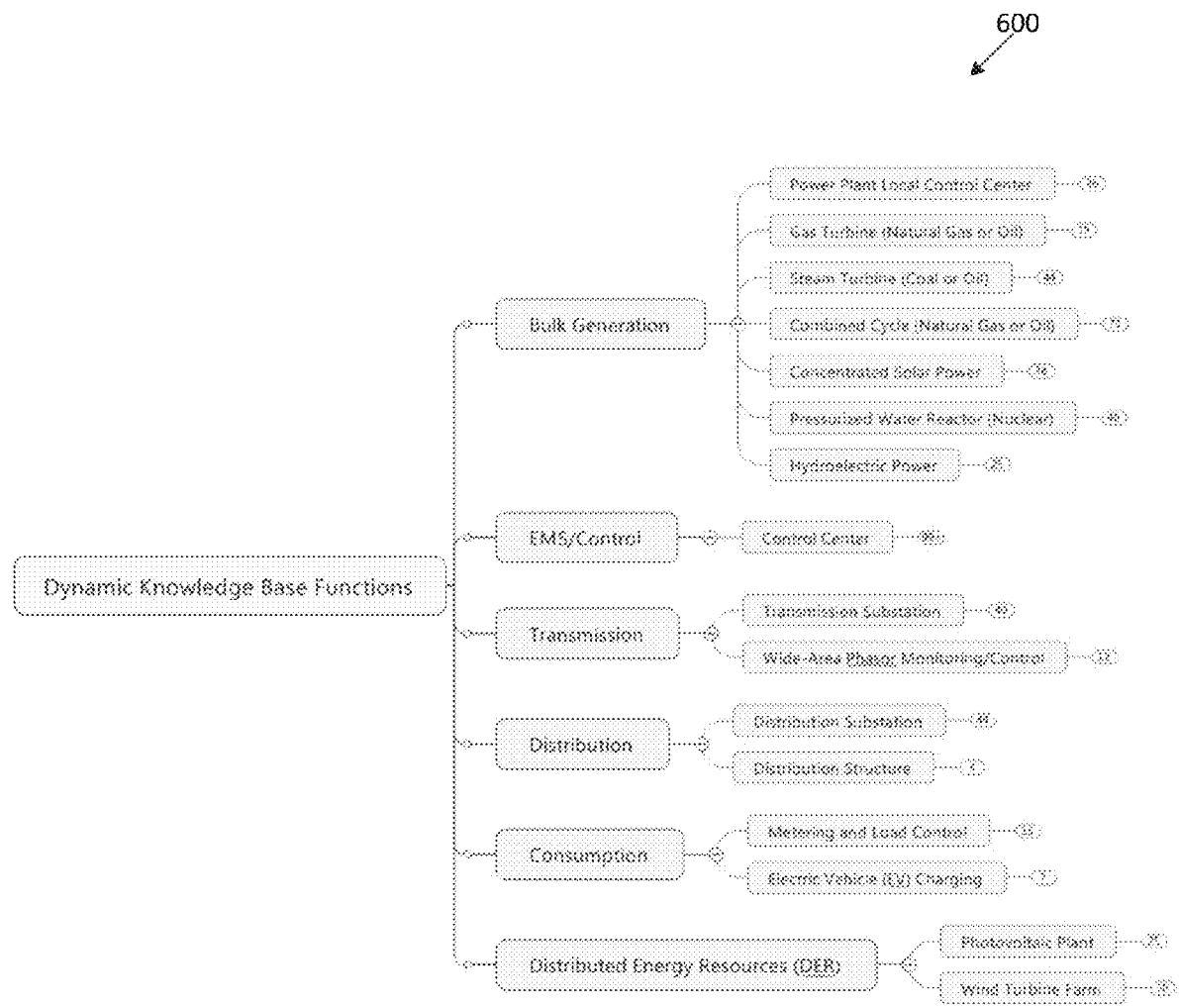
FIG. 6 shows a dynamic knowledge-base model that may be applied by a CCE tool, in accordance with embodiments of the disclosure.

Turning back to FIG. 1, phase 2 of the CCE workflow 100 is the system organization phase 120. FIG. 6 shows a dynamic knowledge-base model 600 that may be applied by a CCE tool, in accordance with embodiments of the disclosure. The dynamic knowledge-base model 600 is a process model that identifies critical functions of a target ICS and provides indications of what is known and unknown. Functions/services are cross correlated to sub-systems, equipment, sensors/data, and other components (herein referred to collectively as "sub-systems") that are associated with the critical functions and/or services of the ICS.

Based on the dynamic knowledge-base model 600, various events among the critical sub-systems that would achieve HCEs may be determined. In one embodiment the determination may be based on an analysis of each such critical sub-system to determine whether failure of the sub-system would result in an HCE. A series of events that may lead to such a failure are identified. For example, malicious load shedding, malicious firmware update, destruction of metering, destruction of sensors, etc. Cyber pathways may be identified that could be used by an attacker to cause the series of identified events. In one embodiment, the cyber pathways may be scored based on a risk-index that is indicative of the pathway actually being exploited.

Figure 7B:
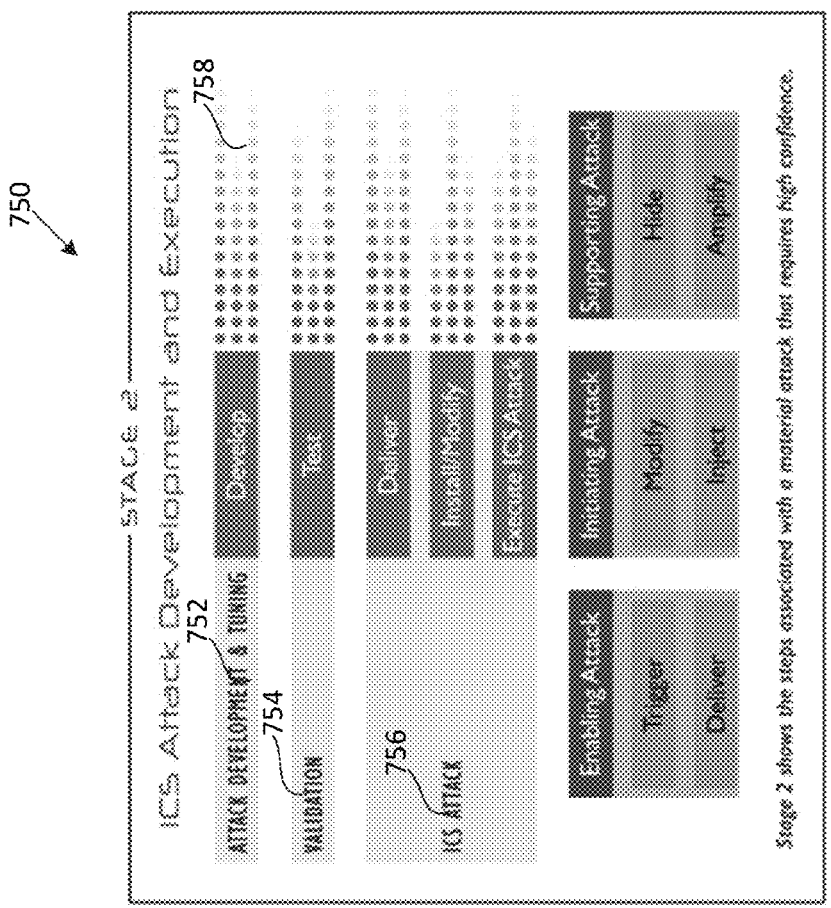
FIG. 7B shows a representation of an ICS attack development and execution model, in accordance with embodiments of the disclosure.
Figure 7A:
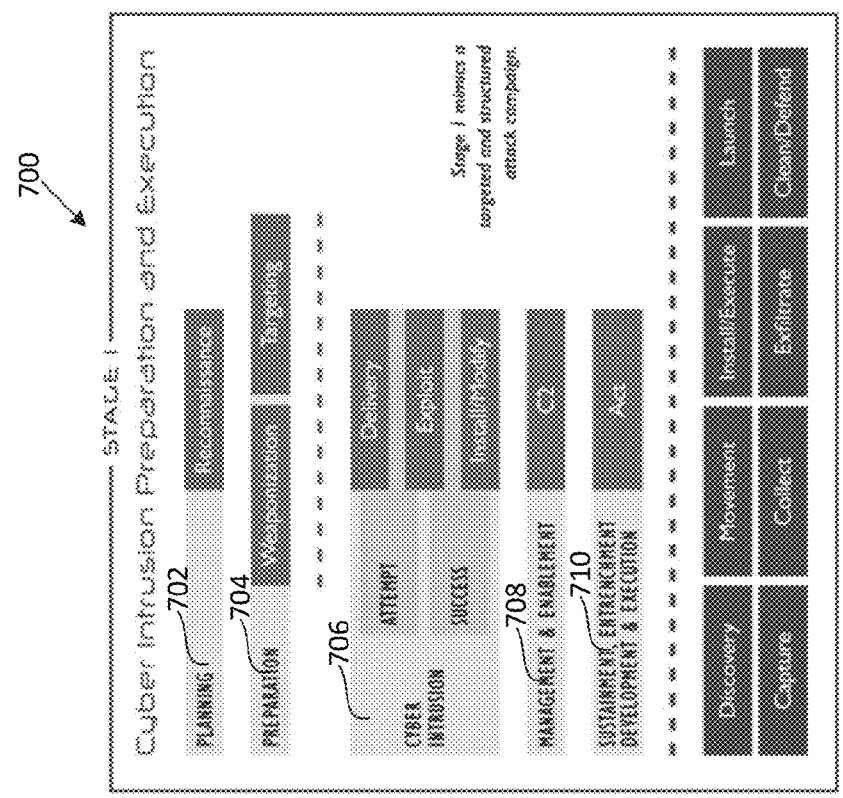
FIG. 7A shows a representation of a cyber intrusion preparation and execution model that may be applied by a CCE tool, in accordance with embodiments of the disclosure.

Turning back to FIG. 1, phase 3 of the CCE workflow 100 is the targeting phase 130. In one embodiment, a CCE tool may apply a consequence based targeting model. FIG. 7A shows a representation of a cyber intrusion preparation and execution model 700 that may be applied by a CCE tool, in accordance with embodiments of the disclosure. FIG. 7B shows a representation of an ICS attack development and execution model 750, in accordance with embodiments of the disclosure. The cyber intrusion preparation and execution model 700 may include cyber intrusion preparation criteria: planning 702, and preparation 704. The cyber intrusion preparation and execution model 700 may include cyber intrusion execution criteria: cyber intrusion 706; management & enablement 708; and sustainment, entrenchment, development and execution 710.

ICS attack development and execution model 750 may include attack development criteria: attack development and tuning 752, and validation 754. The ICS attack development and execution model 750 may include execution criteria such as ICS attack 756. Confidence levels 758 may be associated with the attack development and execution criteria.

Turning back to FIG. 1, phase 4 of the workflow 100 is mitigation 140. In one embodiment, the CCE tool may apply mitigation, protection, and tripwires, which correlate to the one or more attack vectors for cyber pathways. Available techniques may be scored and selected based on an applied score and a cost-function.

The foregoing description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

In the foregoing detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the foregoing description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Various embodiments described herein may include elements described as implemented in a "workstation," "computer," or a "computer system." Here, the terms "workstation," "computer," and "computer system" are to be understood to include at least one non-transitory computer-readable medium and at least one processing unit. In general, the storage medium will store, at one time or another, at least portions of an executable program code, and a processor(s) will execute one or more of the instructions included in that executable program code. It will be appreciated that the term "executable program code" and the term "software" mean substantially the same thing for the purposes of this description. It is not necessary to the practice of the various embodiments described herein that the storage medium and the processing unit be physically located in the same place. That is to say, it is foreseen that the processor and the memory might be distributed among physical pieces of equipment or even in geographically distinct locations. One of ordinary skill in the art will appreciate that "media," "medium," "storage medium," "computer-readable media," or "computer-readable medium" as used here, may include a diskette, a magnetic tape, a digital tape, a compact disc, an integrated circuit, a ROM, a CD, DVD, Blu-Ray, a cartridge, flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this disclosure, the software will be referred to simply as being "in" or "on" a main memory that is a computer-readable medium. Thus, the terms "in" or "on" are intended to encompass the above mentioned and all equivalent and possible ways in which software can be associated with a computer-readable medium.

Users may interact with the computer systems described herein by way of graphical user interfaces (GUIs) on a display and input devices such as touchscreens, keyboards, a computer mouse, touchpads, buttons, switches, jumpers, and the like. A GUI may include a console and/or dashboard and a user may interact with the GUI and, in turn, underlying software applications.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

We claim:

1. A computer system, comprising:
   at least one processor; and
   a non-transitory computer-readable storage medium having instructions thereon, wherein, when executed, the instructions are adapted to cause the processor to:
      define a target industrial control system (ICS), wherein a target ICS includes operational goals, critical functions, and critical services;
      determine one or more scored high consequence events (HCE) associated with the defined target ICS;
      prioritize scored HCEs according to an HCE severity index;
      update a dashboard with one or more representations of the prioritized HCEs;
      determine mitigation, protection, and tripwires responsive to the prioritized HCEs;
      determine scores of techniques for responding to the prioritized HCEs, wherein respective scores of techniques represent capability of respective techniques to implement the determined mitigation, protection, and tripwires at the target ICS in response to the prioritized HCEs; and
      select one or more of the techniques responsive to the determined scores and a cost function.

2. The system of claim 1, wherein the dashboard is configured to present the representations of the HCEs according to priorities.

3. The system of claim 1, wherein the dashboard is configured to receive parameters for determining the one or more scored HCE, the parameters comprising assumptions and boundary conditions, scenario development, and ranking criteria.

4. The system of claim 1, wherein, when executed, the instructions are adapted to cause the processor to:
   calculate an HCE severity for each of the HCEs; and
   prioritize the HCEs responsive to the HCE severity for each of the HCEs.

5. The system of claim 4, wherein the HCE severity is calculated responsive to an area impacted, a duration of the event, an attack breadth, a system integrity, a safety, and a cost of the event.

6. A computer-implemented method, comprising:
   defining a target industrial control system (ICS), wherein the target ICS includes operational goals, critical functions, and critical services;
   determining one or more scored high consequence events (HCE) associated with the defined target ICS;
   prioritizing the scored HCEs according to an HCE severity index;
   updating a dashboard with one or more representations of the prioritized HCEs, wherein the updated dashboard is presented at a display;
   determining critical sub-systems of target ICS that impact critical functions or services of the defined target ICS;
   determining a series of events for each of the determined critical sub-systems that would cause the scored HCEs associated with the defined target ICS;
   defining cyber pathways to achieve the determined series of events; and
   scoring the defined cyber pathways based, at least in part, on an index that associates cyber pathways with risk levels where respective risk levels represent likelihoods that associated cyber pathways are actually being exploited.

7. The method of claim 6, further comprising determining critical functions and services responsive to operational goals.

8. The method of claim 6, further comprising:
   determining potential attack vectors for the defined cyber pathways;
   determining a series of steps to achieve the potential attack vectors; and
   prioritizing the potential attack vectors responsive to the determined series of steps.

9. The method of claim 8, further comprising:
   determining mitigation, protection, and tripwires for a subset of prioritized potential attack vectors;
   determining scores for techniques responsive to respective capability to address the mitigation, protection, and tripwires for the subset of the prioritized potential attack vectors; and
   selecting one or more of the techniques responsive to the determined scores and a cost function.

\* \* \* \* \*

UNITED STATES PATENT AND TRADEMARK OFFICE
CERTIFICATE OF CORRECTION

PATENT NO. : 11,483,331 B2
APPLICATION NO. : 16/290511
DATED : October 25, 2022
INVENTOR(S) : Michael Assante et al.

It is certified that error appears in the above-identified patent and that said Letters Patent is hereby corrected as shown below:

In the Specification
Column 1, Line 62, change "(STEMS)" to --(SIEMS)--

Signed and Sealed this
Thirteenth Day of June, 2023

Katherine Kelly Vidal
*Director of the United States Patent and Trademark Office*